US010201000B2

(12) United States Patent
Cheng et al.

(10) Patent No.: US 10,201,000 B2
(45) Date of Patent: Feb. 5, 2019

(54) INTERFERENCE MITIGATION DURING SIMULTANEOUS OPERATION OF MULTIPLE RADIOS IN A WIRELESS DEVICE

(71) Applicants: ZTE Corporation, Shenzhen (CN); ZTE Canada Inc., Toronto (CA)

(72) Inventors: Dajun Cheng, Kanata (CA); Tao Jiang, Kanata (CA); Hongwei Zhang, Shanxi (CN)

(73) Assignees: ZTE Corporation, Shenzhen (CN); ZTE Canada Inc., Ontario (CA)

( * ) Notice: Subject to any disclaimer, the term of this patent is extended or adjusted under 35 U.S.C. 154(b) by 74 days.

(21) Appl. No.: 15/402,935

(22) Filed: Jan. 10, 2017

(65) Prior Publication Data

US 2017/0201997 A1  Jul. 13, 2017

(30) Foreign Application Priority Data

Jan. 11, 2016 (WO) ................. PCT/CN2016/070565

(51) Int. Cl.
*H04W 72/00* (2009.01)
*H04W 72/08* (2009.01)
(Continued)

(52) U.S. Cl.
CPC ......... *H04W 72/082* (2013.01); *H04W 76/16* (2018.02); *H04W 72/0453* (2013.01)

(58) Field of Classification Search
CPC ..... H04L 5/0053; H04L 5/001; H04L 5/0007; H04L 5/0032; H04L 5/0094; H04L 47/14;
(Continued)

(56) References Cited

U.S. PATENT DOCUMENTS

2006/0203731 A1* 9/2006 Tiedemann, Jr. ....... H04L 47/10
370/235
2007/0161377 A1* 7/2007 Kodikara Patabandi ....................
H04W 76/11
455/450
(Continued)

FOREIGN PATENT DOCUMENTS

EP  2 919 542 A1  9/2015

OTHER PUBLICATIONS

Chinese Office Action dated Aug. 20, 2018 for Chinese Patent Application No. 201710006829.6, filed on Jan. 5, 2017 (11 pages).

*Primary Examiner* — Sai Aung
(74) *Attorney, Agent, or Firm* — Perkins Coie LLP

(57) ABSTRACT

Disclosed are apparatus and methods of adaptive frequency channel allocation adjustment to mitigate the in-device interference of simultaneous coexistence operation of multiple radio frequency operation. At least one of channel conflict tables is pre-defined in the device memory. One of the multiple radio frequency operation is prioritized, and the mobile device would request the cellular base transceiver station or the host access point to allocate a non-conflicted frequency channel with respect to the prioritized radio frequency channel. Once the prioritized communication channel changes due to handover or any other reason, the device would check the allocated channels against the pre-defined conflict channel tables and request the access point or the base station to adjust the secondary frequency channel if there exists the conflict channel.

16 Claims, 10 Drawing Sheets

(51) Int. Cl.
*H04W 76/16* (2018.01)
*H04W 72/04* (2009.01)
(58) Field of Classification Search
CPC ... H04L 5/0044; H04L 5/0092; H04L 1/0026; H04L 5/0035
See application file for complete search history.

(56) References Cited

U.S. PATENT DOCUMENTS

2012/0094681 A1\* 4/2012 Freda .................... H04W 72/02
455/452.1
2014/0348073 A1\* 11/2014 Elhaddad .............. H04W 72/08
370/329

\* cited by examiner

INTERFERENCE MITIGATION DURING SIMULTANEOUS OPERATION OF MULTIPLE RADIOS IN A WIRELESS DEVICE

CROSS REFERENCE TO RELATED APPLICATIONS

This patent document claims the benefit of priority under 35 U.S.C. § 119(a) and the Paris Convention of International Patent Application No. PCT/CN2016/070565, filed on Jan. 11, 2016. The entire content of the before-mentioned patent application is incorporated by reference as part of the disclosure of this patent document.

TECHNICAL FIELD

Embodiments of the present invention relate to the field of wireless communication, and more particularly, to channel allocation adjustment to mitigate the in-device interference of simultaneous coexistence operation of radio frequency communication.

BACKGROUND

Many mobile devices have been developed and are being designed that are capable of operation in multiple frequency bands and using multiple communication protocols. Examples of multiple radio frequency bands and multiple communication protocols include but are not limited to cellular bands 1/2/3/4/5/7/8/25/26/34/39/41 to cover the cellular communication technologies of GSM (Global System for Mobile communication), CDMA (Code Division Multiple Access), WCDMA (wideband CDMA), TD-SCDMA (time division synchronous CDMA), LTE (Long Term Evolution), LTE-A, LTE-U, and unlicensed 2.4 GHz and 5 GHz bands for Wi-Fi.

SUMMARY

This document describes techniques for mitigating in-device interference when multiple radios operate simultaneously. In some example embodiments, a matrix table of conflicted channel combination matrix is pre-defined in the device memory. In some implementations, one of the multiple radio frequency operation may be prioritized to have a higher priority over other frequencies of operation, and the device would request a base transceiver station or the access point to allocate a non-conflicted frequency channel with respect to the prioritized radio frequency channel. If the prioritized communication channel changes due to handover, the device would check the allocated channels against the pre-defined conflict channel combination matrix and would request the access point or the base station to adjust the secondary frequency channel if there exists the conflict channel. The multiple radio coexistence would therefore operate outside of the conflict channel table and the in-device interference is mitigated.

In one example aspect, a wireless communication apparatus that includes at least two radio frequency (RF) transceivers, at least one memory unit and a processor is disclosed. The RF transceiver circuits can simultaneously operate at least two RF signals occupying two different frequency bands. The at least one memory unit stores one or more pre-defined channel conflict tables having a number of entries. Each entry in the one or more channel conflict table identifies a pair of RF channels such that operation of the apparatus with the at least two RF signals corresponding to the pair of RF channels causes an unwanted RF interference in the apparatus.

In another example aspect, a wireless communication method for simultaneous operation of a wireless device in at least two different RF bands is disclosed. The method includes processing a first transmission, using a first transceiver circuit of the wireless device, in a first frequency band and processing, contemporaneously with the first transmission, using a second transceiver circuit of the wireless device, a second transmission in a second frequency band that is different from the first frequency band. The first frequency band and the second frequency band are chosen to mitigate unwanted radio frequency interference between the first transmission and the second transmission by storing one or more pre-defined channel conflict tables in a memory, wherein each conflict table comprises entries that identify pairs of frequency bands that cause undesirable intra-device radio frequency interference when used simultaneously, comparing the first frequency band and the second frequency band with entries in the one or more pre-defined channel conflict tables to check for match, and changing value of at least one of the first frequency band and the second frequency band such that the first frequency band and the second frequency band are a pair that is different from every pair of frequency bands listed in the one or more pre-defined channel conflict tables.

In yet another example aspect, a method for wireless communication, implemented in a mobile device, is disclosed. The method includes receiving, via a network interface, initial frequency channel allocations for use by the mobile device in future simultaneous wireless communications, determining, prior to performing wireless transmissions using the initial frequency channel allocations, whether the initial frequency allocations are in a conflict condition because operation using the initial frequency allocations will cause in-device radio frequency interference when receptions and/or transmissions are simultaneously performed, selecting for reallocation, when the initial frequency allocations are conflicting, based on usage priorities currently associated with the wireless connections, a first initial frequency allocation from the initial frequency channel allocations having a lower priority than other frequency allocations from the initial frequency channel allocations, and obtaining, via the network interface, a reallocation of the first initial frequency allocation to a new frequency allocation, thereby eliminating the conflict condition.

This and other aspects and their implementations are described in greater detail in the drawings, the description and the claims.

DETAILED DESCRIPTION

Figure 1:
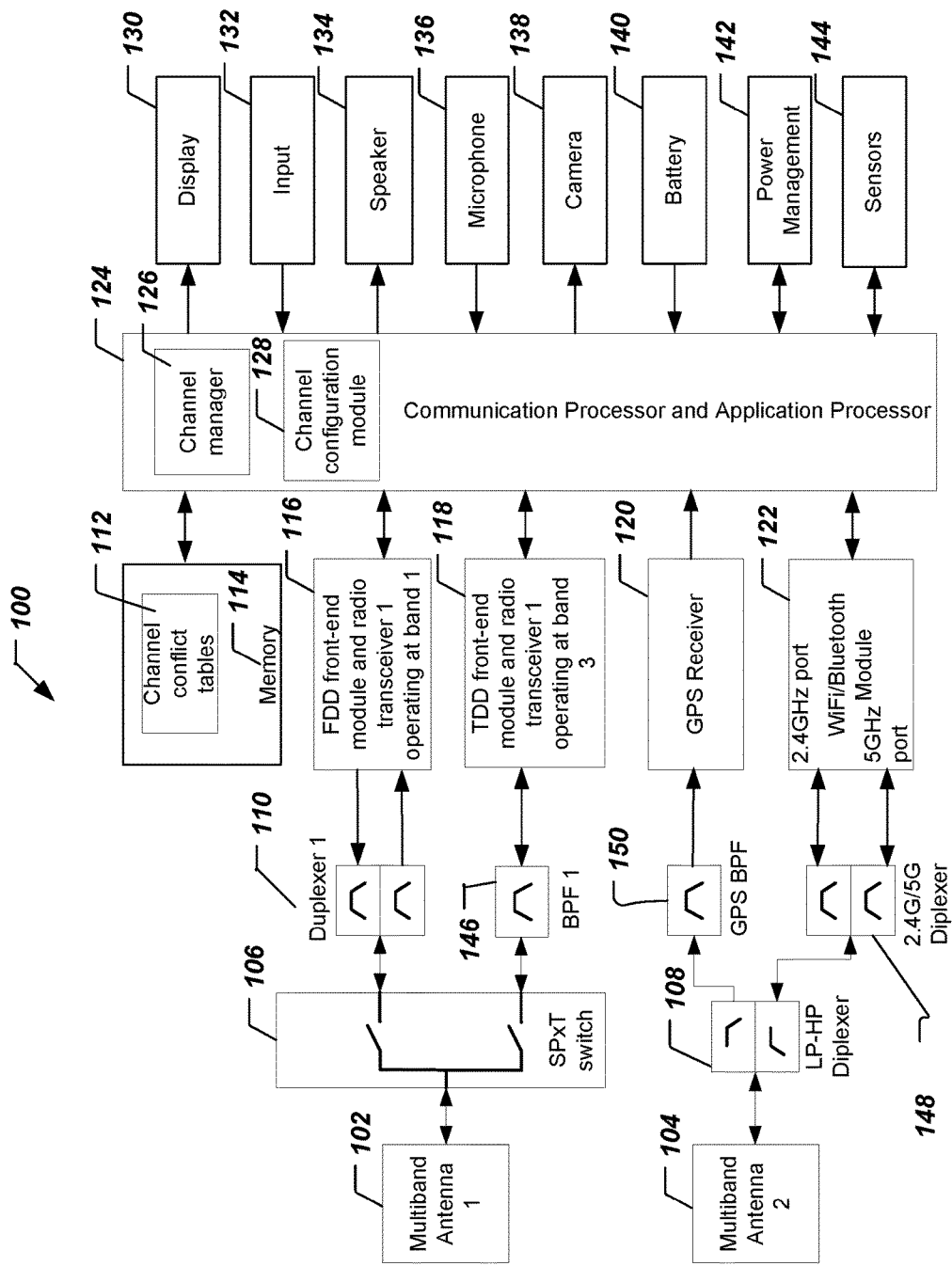
FIG. 1 shows a block diagram of a wireless device having capability of simultaneous communication in two different frequency bands.

A mobile device (MD) may experience self-interference when multiple radio frequency communication simultaneously operate, that is, in-device interference. The in-device interference would degrade the receiver sensitivity when the noise floor or the harmonics of the transmitter waveform ingresses to the frequency channel of the other radio receiver. In another case, when multiple transmitters simultaneously operate, the inter-modulation distortion may occur in the receiver frequency channel of the a radio receiver and hence cause its sensitivity degraded. A simultaneous operation may occur, e.g., when one network interface may be receiving or transmitting at the same time as another physical interface is receiving or transmitting.

A known method to mitigate the in-device interference is to reduce the transmission power of radio communication, which would reduce the cellular coverage and impact quality of the service of the mobile communication. Another possible solution is to use different network interfaces in time domain duplexing (TDD) manner. In TDD sharing, one network interface may receive or transmit at a time, with the opportunities of multiple network interfaces being multiplexed in the time domain. However, many wireless network protocols require a wireless device to follow transmission and reception schedule dictated by the network-side, and thus TDD operation of network interfaces within a wireless device may be difficult and may lead to data loss.

In one beneficial aspect, the disclosed are apparatus and methods of adaptive frequency channel allocation adjustment to mitigate the in-device interference of simultaneous coexistence operation of multiple radio communication service, e.g., cellular communication and simultaneous Wi-Fi operation. A matrix table of conflict channel combination is predefined in the device memory. In the scenario wherein Wi-Fi operation is prioritized, the device would request the cellular base transceiver station to allocate a non-conflicted frequency channel with respect to the operation of the Wi-Fi channel. In the scenario wherein cellular operation is prioritized, the device would request the Wi-Fi access point to allocate a non-conflicted cellular channel to the communication device. In the scenario of LTE carrier aggregation, the mobile device first prioritize a communication channel, such as the anchor channel, and then request the cellular base transceiver station to allocate a non-conflicted frequency channel with respect to the prioritized LTE channel. Once the prioritized communication channel changes due to handover, the device would check the allocated channels against the predefined conflict channel combination matrix and would request the Wi-Fi access point or the base station to adjust the secondary frequency channel if there is a conflict condition, e.g., a conflicting channel exists.

The mobile devices referred to herein include but are not limited to a cellular phone, a portable multimedia player, a tablet, a handheld device, a wearable device, or any other types of devices that have cellular and Wi-Fi communication capabilities.

FIG. 1 is a block diagram representation of an example wireless communication apparatus 100, or a mobile device 100, that is capable of simultaneous transmissions and/or receptions in multiple frequency bands. The apparatus 100 is shown to have simultaneous cellular and Wi-Fi communication capabilities. For multiband cellular communication, a first multiband antenna 102 electrically connects with one port of a single-pole-multi-throw (SPxT) switch 106, which is an antenna-side port. The other ports, e.g., device-side ports, of the SPxT switch 106 connect at least a duplexer 110 and/or at least a bandpass filter (BPF) 146. Each of the duplexer 110 and/or the BPF 146 has an antenna-side port connected to the switch 106, and a device-side interface connecting with a radio frequency (RF) front end module (FEM) 116 and transceiver and the processor 124.

For Wi-Fi wireless connectivity, a second multiband antenna 104 is introduced to connect with a diplexer 148 and the Wi-Fi module 122. The diplexer 148 may be used to isolate the two frequency bands 2.4 GHz and 5 GHz band used in Wi-Fi. The apparatus 100 may also include a Global Positioning System (GPS) receiver 120, whose antenna-side interface may be electrically coupled with a bandpass filter BPF 150 that is centered to around the GPS frequency band, and a device-side interface coupled to the communications processor/application processor 124. The GPS BPF 150 and diplexer 148 connect with the second multiband antenna 104 through the low pass and high pass (LP-HP) diplexer 108.

Inside the memory 114, pre-determined channel conflict tables 112 may be stored. The tables 112, described herein, store conflict channel information among LTE communication channels and the Wi-Fi channels. The processor 124 includes a channel configuration module 128 and a channel manager 126. The channel configuration module 128 configures the RF channels of LTE and Wi-Fi transceivers by using a digital phase locked loop (PLL) circuit (not shown). The channel manager 126 determines which RF channel should be used based on a priority algorithm. In some embodiments, the processor 124, e.g., the baseband communication processor, performs digital signal processing for wireless communication protocols, and may include an application processor core to support the MD's applications including memory management, multimedia and graphic processing, and so on.

The pre-determined channel conflict tables 112, stored in the memory, and the channel manager module 126 in the application processor 124 may together work to avoid conflict situation during simultaneous operation of multiple radio frequency communication. The channel conflict tables 112 list the channel pairs that are targeted to avoid to mitigate the in-device interference of multiple radio coexistence operation. The channel manager module 126 in the application processor 124 may read the channel conflict tables (memory management), execute signaling commands for adaptive frequency channel allocation adjustment, and commands the channel configuration circuit to operate in the appropriate channels.

For simplicity of explanation, FIG. 1 only explicitly illustrates an example embodiment of cellular, Wi-Fi, and GPS (global positioning system) wireless communication capabilities. In some embodiments, other wireless communication subsystems that include, but are not limited to, Bluetooth and WiGig could be present without losing the generality of the apparatus and methods for adaptive frequency channel allocation adjustment to mitigate the in-device interference of multiple radio coexistence operation.

By way of examples, other possible functions included in the apparatus 100 are a display 130, e.g., a touch sensitive display, an input mechanism 132, e.g., touch sensor, a mouse or another suitable human interface device (HID), one or more speakers 134 for outputting sound, a microphone 136 for capturing audio, a camera 138 for taking pictures or video, a battery bay 140 with a battery providing power to the apparatus 100, a power management module 142 that may control power consumption of the apparatus 100, e.g., by adjusting screen brightness or monitoring battery level, one or more sensors 144, for sensing orientation and other movement of the apparatus 100, ambient light, etc. The apparatus 100 may also include peripheral bus interfaces such as universal serial bus (USB), HDMI, or Lightening interface.

Table 1 presents an example of a cellular and Wi-Fi conflict channel table, wherein the cellular communication uses Band 2.

TABLE 1

An example conflict channel table

| Band 2 Uplink channel | | Conflicted Wi-Fi channel | |
|---|---|---|---|
| channel number | central freq. (MHz) | channel number | central freq. (MHz) |
| 18600 | 1850.0 | 112 | 5560 |
| ... | ... | | |
| 18666 | 1856.6 | | |
| 18667 | 1856.7 | 116 | 5580 |
| ... | ... | | |
| 18733 | 1863.3 | | |
| 18734 | 1863.4 | 120 | 5600 |
| ... | ... | | |
| 18800 | 1870.0 | | |
| 18801 | 1870.1 | 124 | 5620 |
| ... | ... | | |
| 18866 | 1876.6 | | |
| 18867 | 1876.7 | 128 | 5640 |
| ... | ... | | |
| 18933 | 1883.3 | | |
| 18934 | 1883.4 | 132 | 5660 |
| ... | ... | | |
| 19000 | 1890.0 | | |
| 19001 | 1890.1 | 136 | 5680 |
| ... | ... | | |
| 19066 | 1896.6 | | |
| 19067 | 1896.7 | 140 | 5700 |
| ... | ... | | |
| 19133 | 1903.3 | | |
| 19134 | 1903.4 | N/A | N/A |
| ... | ... | | |
| 19199 | 1909.9 | | |

Table 2 presents an example of a cellular and Wi-Fi conflict channel table, wherein the cellular communication uses Band 3.

TABLE 2

An example conflict channel table

| Band 3 Uplink channel | | Conflicted Wi-Fi channel | |
|---|---|---|---|
| channel number | central freq. (MHz) | channel number | central freq. (MHz) |
| 19200 | 1710.0 | N/A | N/A |
| ... | ... | | |
| 19333 | 1723.3 | | |
| 19334 | 1723.4 | 36 | 5180 |
| ... | ... | | |
| 19400 | 1730.0 | | |
| 19401 | 1730.1 | 40 | 5200 |
| ... | ... | | |
| 19466 | 1736.6 | | |
| 19467 | 1736.7 | 44 | 5220 |
| ... | ... | | |
| 19533 | 1743.3 | | |
| 19534 | 1743.4 | 48 | 5240 |
| ... | ... | | |
| 19600 | 1750.0 | | |
| 19601 | 1750.1 | 52 | 5260 |
| ... | ... | | |
| 19666 | 1756.6 | | |
| 19667 | 1756.7 | 56 | 5280 |
| ... | ... | | |
| 19733 | 1763.3 | | |
| 19734 | 1763.4 | 60 | 5300 |
| ... | ... | | |
| 19800 | 1770.0 | | |
| 19801 | 1770.1 | 64 | 5320 |
| ... | ... | | |
| 19866 | 1776.6 | | |
| 19867 | 1776.7 | N/A | N/A |
| ... | ... | | |
| 19949 | 1784.9 | | |

Table 3 presents an exemplary and Wi-Fi conflict channel table, wherein the cellular communication uses Band 4.

TABLE 3

An example conflict channel table

| Band 4 Uplink channel | | Conflicted Wi-Fi channel | |
|---|---|---|---|
| channel number | central freq. (MHz) | channel number | central freq. (MHz) |
| 19950 | 1710.0 | N/A | N/A |
| ... | ... | | |
| 20083 | 1723.3 | | |
| 20084 | 1723.4 | 36 | 5180 |
| ... | ... | | |
| 20150 | 1730.0 | | |
| 20151 | 1730.1 | 40 | 5200 |
| ... | ... | | |
| 20216 | 1736.6 | | |
| 20217 | 1736.7 | 44 | 5220 |
| ... | ... | | |
| 20283 | 1743.3 | | |
| 20284 | 1743.4 | 48 | 5240 |
| ... | ... | | |
| 20350 | 1750.0 | | |
| 20351 | 1750.1 | 52 | 5260 |
| ... | ... | | |
| 20399 | 1756.6 | | |

As shown by the tabular examples, the channel entries may be identified by either a frequency, or a protocol and its corresponding channel number, or both.

In Table 1, Table 2, and Table 3, the first column refers to an uplink channel number, the second column refers to the corresponding central frequency. The third column lists a conflicting channel, e.g., a channel that is not to be used, in terms of its channel number. The fourth column lists the corresponding central frequency of the conflicted channel. As seen from the tables, it may be possible for a given conflicting channel to be the conflicting channel for multiple operational channel entries in the left two columns.

In some embodiments implementing the LTE and Wi-Fi coexistence, the activity of LTE and Wi-Fi communication may be prioritized based on the applications using the respective network connections. The prioritization may be determined a priori by the designer of the apparatus or the service or a network operator based on usage model. Based on the a priori design, an LTE-Wi-Fi priority table may be stored in the memory 114 of the device.

In some embodiments, an application that relies on low latency, continuous data communication may be given higher priority over another application that may be more tolerant to message delays. For example, Wi-Fi activity may be given higher priority when a Wi-Fi video call is ongoing while the user is transmitting and/or receiving short message through LTE cellular network, which may be given lower priority. In another example, when the user is using LTE network to have audio conversation while the Wi-Fi connectivity is operating to download file, the LTE activity can be prioritized over the Wi-Fi activity. Alternatively or additionally, the LTE or Wi-Fi activity can be prioritized simply and only according to the communication initialization time, i.e., the first activity of either LTE or Wi-Fi would have high communication priority.

Figure 2A:
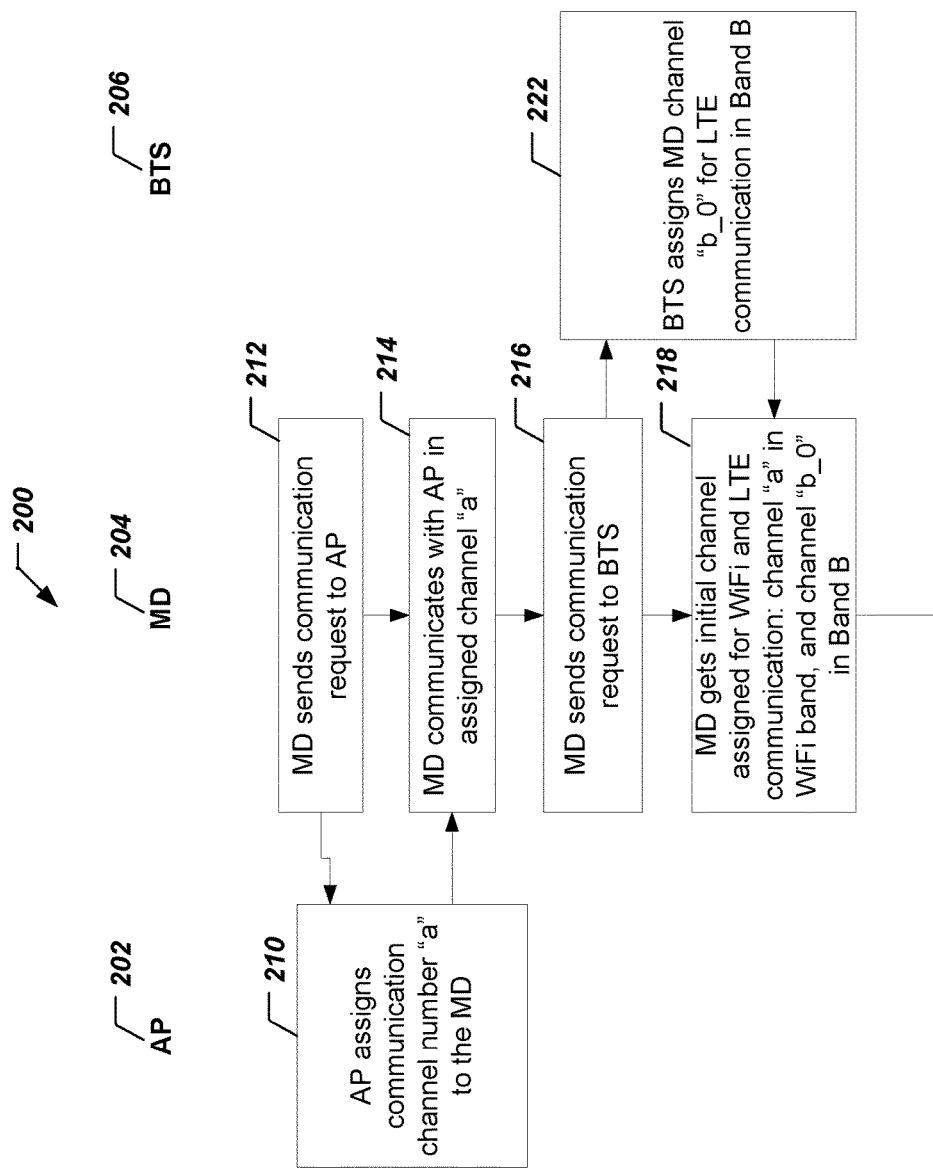
FIG. 2A shows an example flowchart of simultaneous operation in cellular and Wi-Fi bands, where Wi-Fi connectivity is prioritized.
Figure 2B:
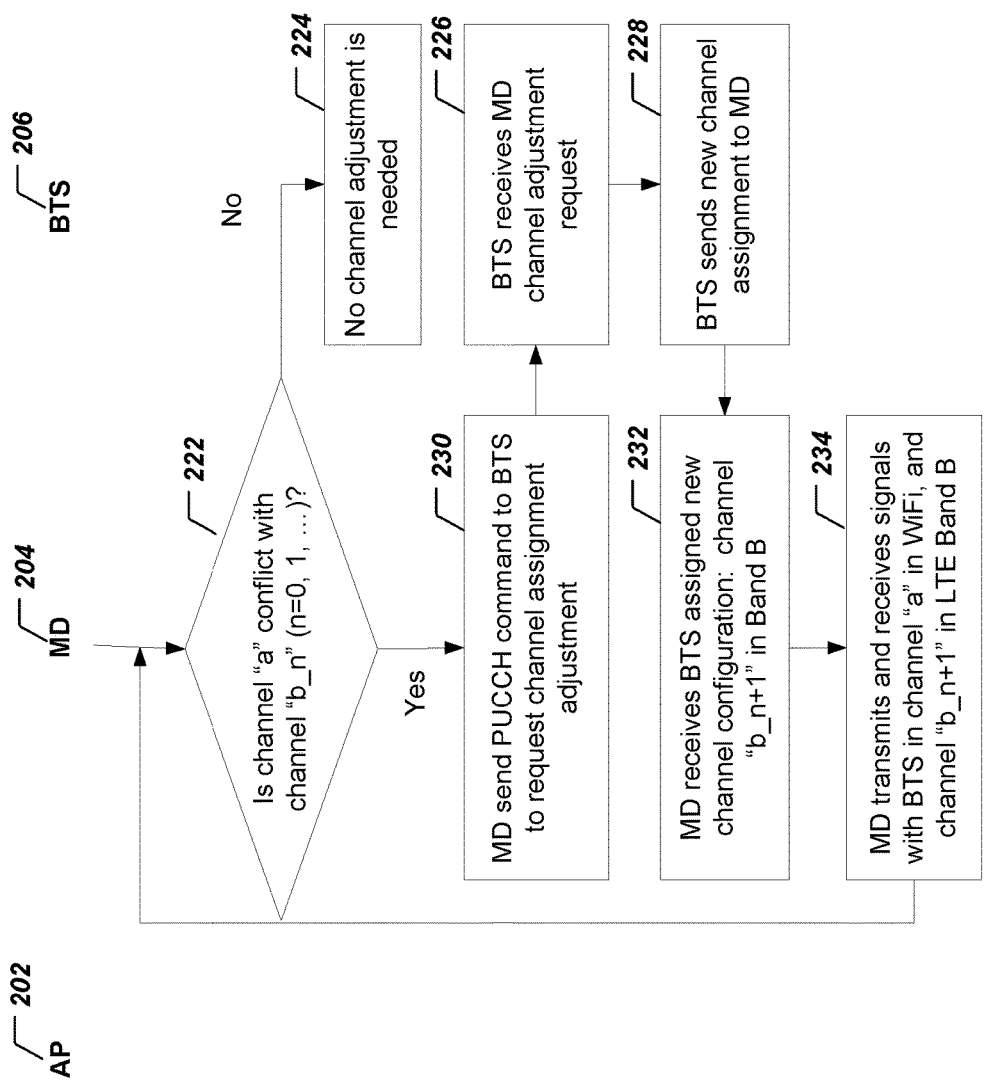
FIG. 2B shows another example flowchart of simultaneous operation in cellular and Wi-Fi bands, where Wi-Fi connectivity is prioritized.

FIG. 2A and FIG. 2B show flow charts of examples of messages exchanged for achieving coexistence of cellular and Wi-Fi operation, where the Wi-Fi connectivity is prioritized. In this scenario, the mobile device MD 204 (similar to the mobile device 100) first sends a communication request to the Wi-Fi access point (AP) 202 (212) and the AP 202 assigns a communication channel number "a" to the mobile device 204 (210). The mobile device 204 establishes the communication with the AP in the assigned RF channel "a" (214). Later, the mobile device 204 sends communication request to the cellular base transceiver station (BTS) 206 (216), and the BTS 206 assigns the mobile device a preliminary channel "b_0" for communication with the BTS (222). The channel manager 126 in the processor 124 compares the communication channels "a" and the preliminary channel "b_0" against the channel conflict table to check if "a" and "b_0" are conflict. If no conflict is identified, no channel adjustment is needed (224) and the mobile device will continue to communication with AP in channel "a" and with BTS in channel "b_0" (218).

If channel conflict is identified (222), the mobile device will send a command message of physical uplink control channel (PUCCH) to the BTS to request channel assignment adjustment (230). In some embodiments, the mobile device may have a user-specified or a network-operated specified channel preference about which channels to preferably use when a channel reassignment is performed. The MD 204 may include this information in the request. The BTS 206 receives the channel adjustment request (226) from the MD 204. The BTS 206 will assign a new channel "b_1" to the mobile device 204 and send the new channel assignment to the MD 204 in a message (228). Upon receiving the new channel assignment, the MD 204 may then re-tune its LTE interface to the new channel (232) and, when no additional conflicts are detected, begins to transmit and receive signals, e.g., data, with BTS and with the Wi-Fi access point (234). The process of finding a non-conflicting cellular channel may be iterated until a channel with no conflict is found, and the MD 204 can communicate with AP in channel "a" and with BTS in channel "b_n+1" (n=0, 1, . . . ), wherein channels "a" and "b_n+1" are not in the list of channel conflict tables.

Figure 3A:
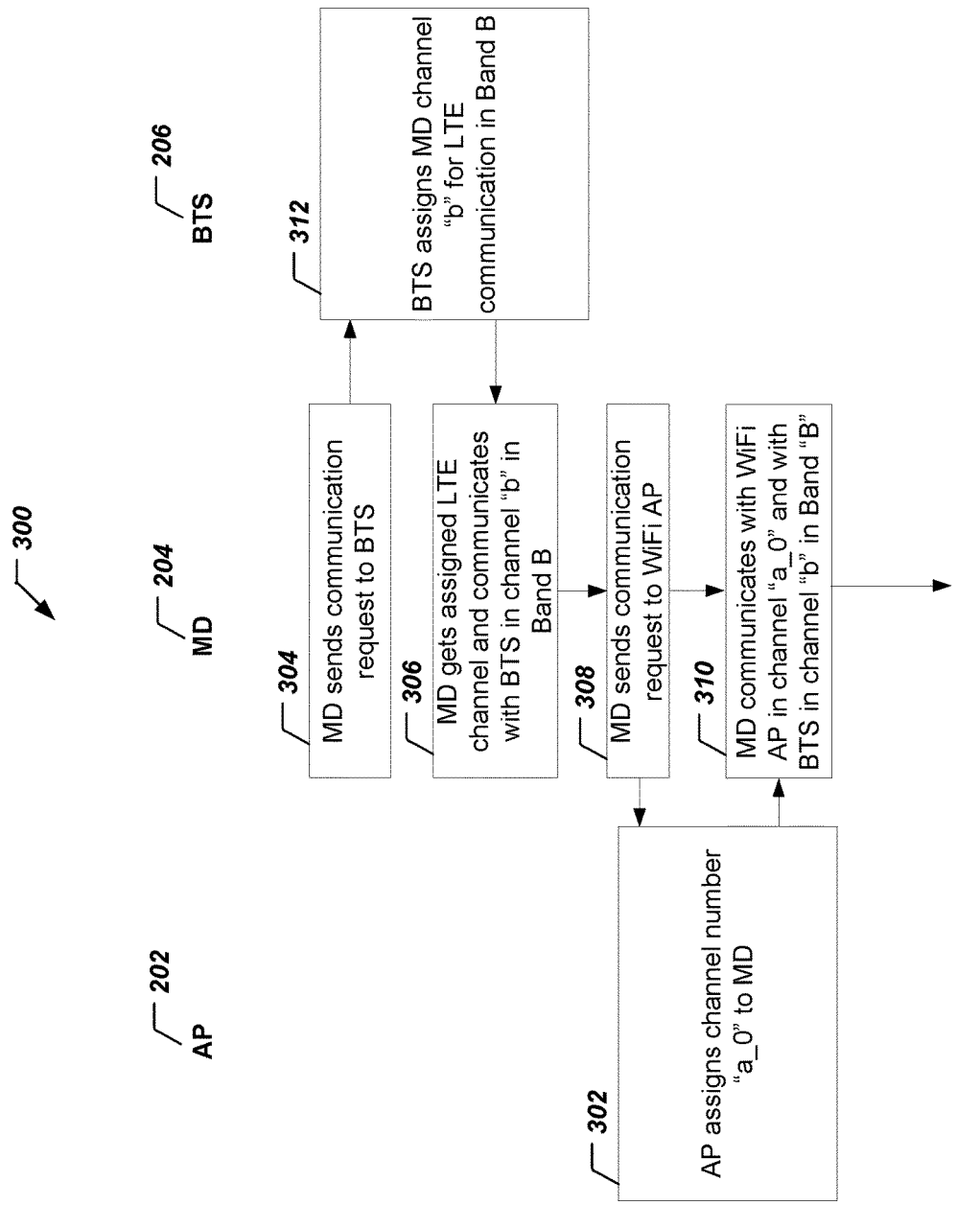
FIG. 3A shows an example flowchart of coexistence of cellular and Wi-Fi operation, where the cellular connectivity is prioritized.
Figure 3B:
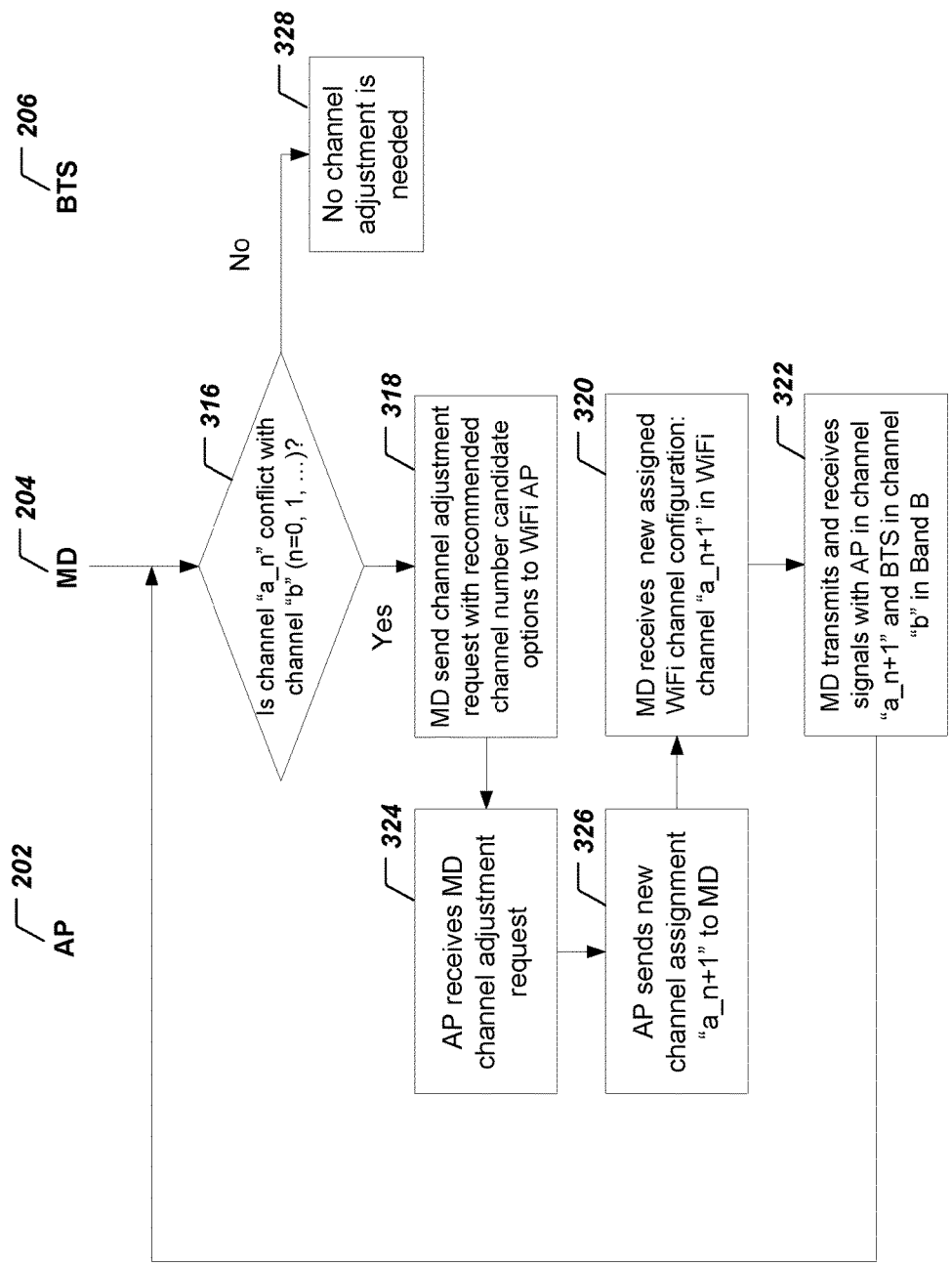
FIG. 3B shows another example flowchart of coexistence of cellular and Wi-Fi operation, where the cellular connectivity is prioritized.

FIG. 3A and FIG. 3B show an example process flow 300 to achieve cellular and Wi-Fi operation, where the cellular connectivity is prioritized. In this scenario, the MD 204 sends a communication request (304) to the BTS 206. The BTS 206 assigns the MD 204 an RF channel "b" for cellular communication (312). The MD 204 receives the assigned LTE channel message and communicates with the BTS 206 over the assigned channel "b" (306). Later, the MD 204 sends a communication request to the Wi-Fi access point (308). In response to the communication request, the AP 202 assigns the MD 204 a preliminary channel "a_0" for communication with the AP 202 (302).

The channel manager 126 in the processor 124 compares the communication channels "b" and the preliminary channel "a_0" against the channel conflict table to check if channels "b" and "a_0" are conflict (316). If no conflict is identified, no channel adjustment is needed (328) and the mobile device will continue to communication with AP in channel "a_0" and with BTS in channel "b". If channel conflict is identified, the MD 204 sends a physical channel adjustment message to the AP to request channel assignment adjustment 318. The AP 202 receives the channel adjustment request (324). The AP 202 will assign a new channel "a_1" to the mobile device (326). The MD 204 receives the new assigned channel configuration (320). The signaling process is iterated until no channel conflict is found, and the mobile device can communicate with AP in channel "a_n+1" (n=0, 1, . . . ) (322) and with BTS in channel "b" wherein channels "a_n+1" and "b" are not in the list of channel conflict tables.

Figure 4A:
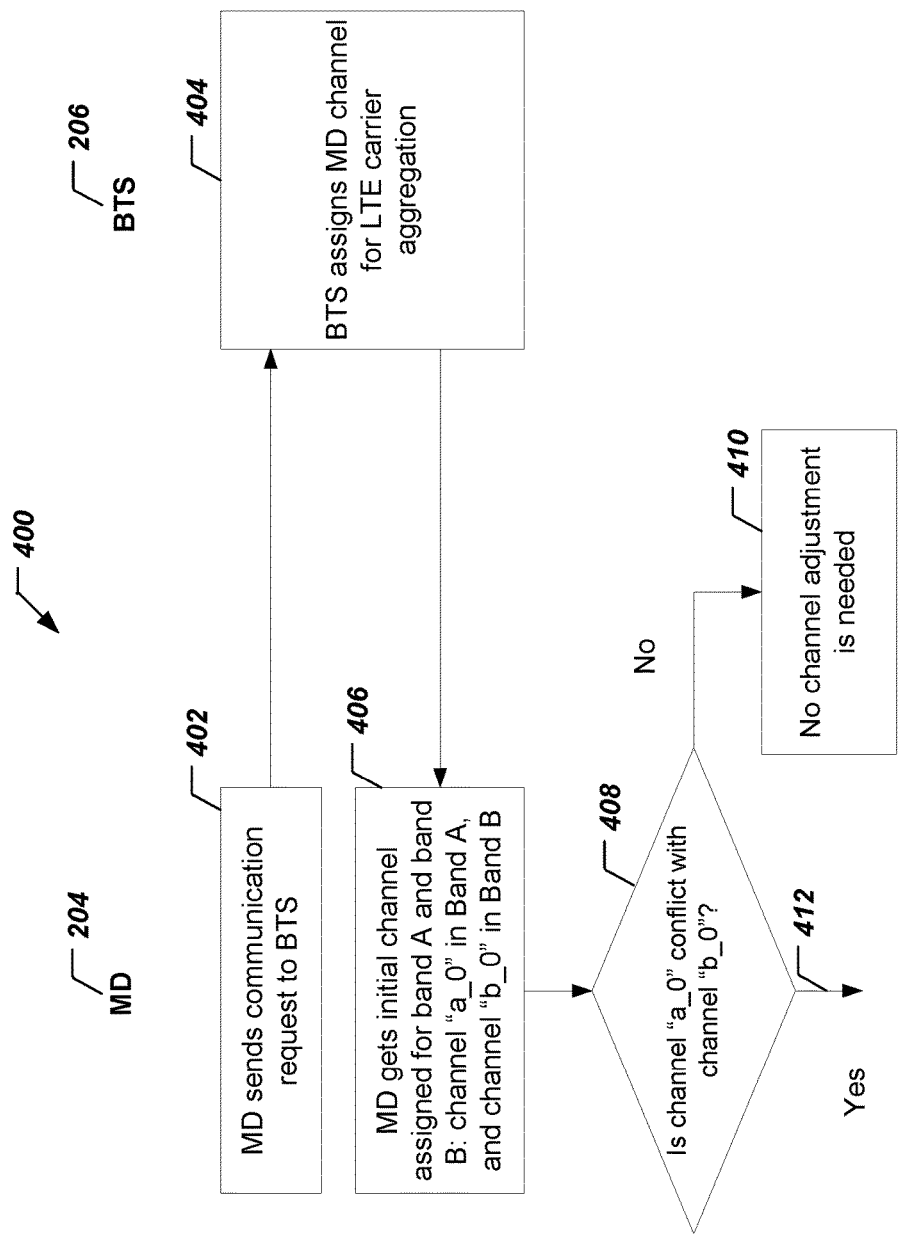
FIG. 4A shows an example flowchart of a method of coexistence of two cellular radio communication.
Figure 4B:
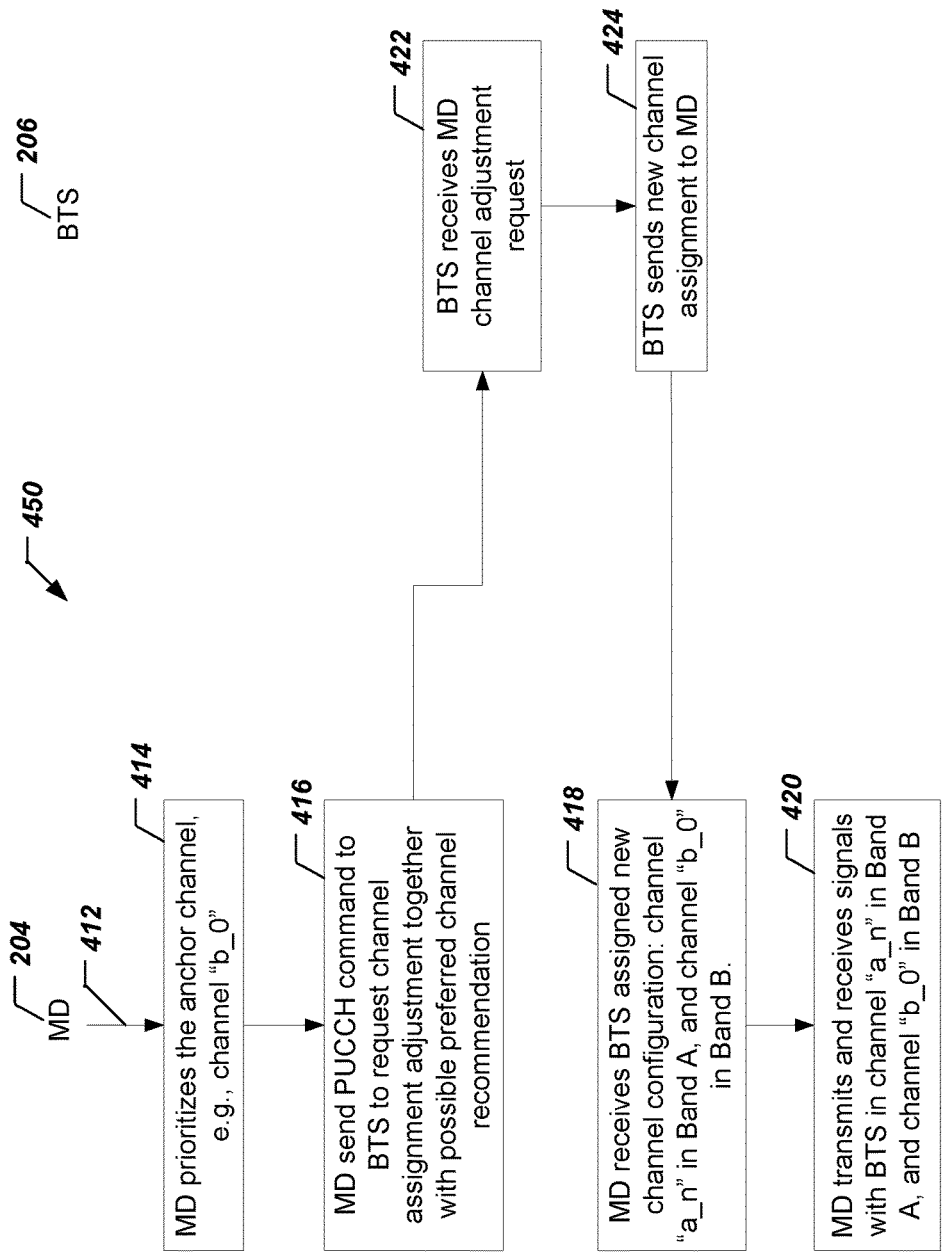
FIG. 4B shows another example flowchart of a method of coexistence of two cellular radio communication.

FIG. 4A and FIG. 4B show an example of a signaling process flow chart 400 of coexistence of carrier aggregation in the MD 204. The MD 204 sends a communication connection request (402) to the BTS 206. The BTS 206 receives the request and allocates a preliminary channel "a_0" in Band A and preliminary channel "b_0" in Band B for carrier aggregation (404). The MD 204 receives the channel assignment of two channels for performing channel aggregation (406). The RF transceiver 116 of the MD 204 reports the channel information (channels "a_0" and "b_0") to the processor 124. The channel manager 126 compares the preliminary channels "a_0" and "b_0" against the channel conflict table 112 to check if channels "a_0" and "b_0" are conflict (408). If no conflict is identified, no channel adjustment is needed and the mobile device will continue to communication in channel "a_0" and "b_0" for carrier aggregation (410). If channel conflict is identified (412), the mobile device will first prioritized one of the channels, typically the anchor channel, e.g., channel "b_0" (414). Next, the MD 204 will send a request (416) to the BTS 206. The request may be for a physical channel adjustment to request channel assignment adjustment to the secondary channel, e.g., channel "a_0", with a possible preferred channel recommendation. The BTS 206 receives the request and will assign a new channel "a_n" to the MD 204 (422). The BTS 206 sends the reassignment to the MD 204 (424). The MD 204 receives this message and begins to communicate over the cellular network using carrier aggregation of the newly assigned channels (420). The signaling process is iterated until no channel conflict is found, and the mobile device can operate with carrier aggregation and communicate with the BTS in channel "a_n" and channel "b_0" wherein channels "a_n" and "b_0" are not in the list of channel conflict tables.

The carrier aggregation (CA) technique and the example embodiments depicted in FIG. 4A and FIG. 4B could cover the standard LTE CA, or may be extended to include the LTE in unlicensed band (LTE-U). In the case of LTE-U multiple radio simultaneous operation, the anchor channel is in the cellular bands and the non-anchor channels are in the unlicensed 5 GHz band, and the anchor channel is being prioritized to have higher priority.

The signaling process flow as described in FIGS. 2A, 2B, 3A, 3B, 4A and 4B may iterate when the prioritized communication channel changes due to handover or any other reason. When the prioritized communication channel changes, the mobile device may re-check the allocated channels against the predefined conflict channel combination matrix and would re-prioritize the communication channel and request the access point or the base station to adjust the secondary frequency channel if a conflict situation has occurred due to the change to the communication channel, e.g., a channel conflict exists.

Figure 5:
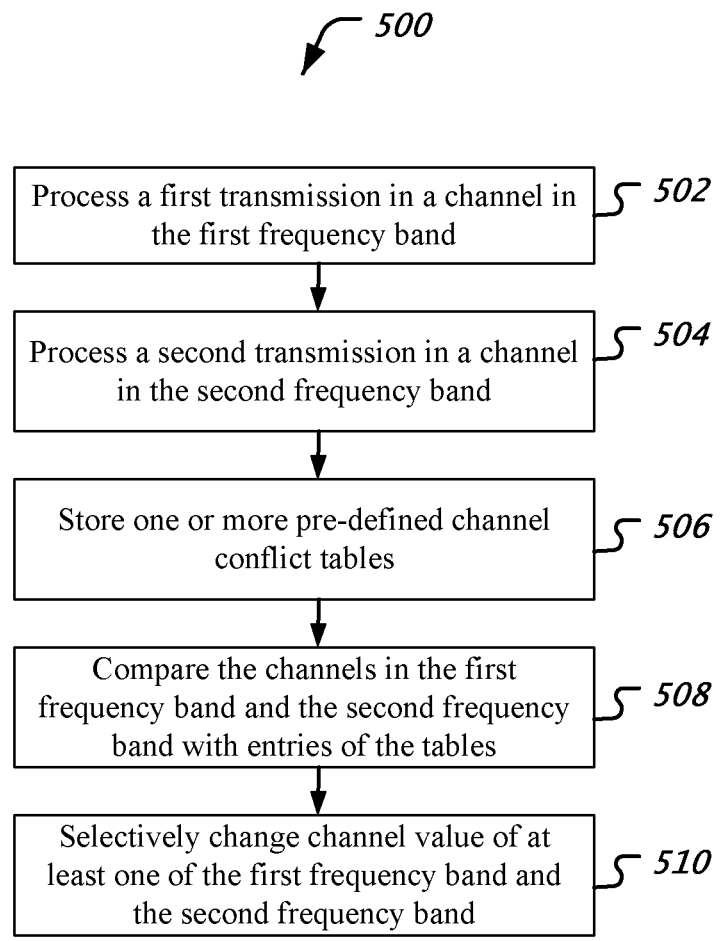
FIG. 5 is a block diagram of an example wireless communication apparatus.

FIG. 5 shows a flowchart for an example method 500 of wireless communication. The method 500 may be implemented by a wireless communication device to be able to simultaneously operate in two different RF bands, e.g., be able to simultaneously transmit and/or receive data.

The method 500 includes, at 502, processing a first transmission, using a first transceiver circuit of the wireless device, from a channel in the first frequency band. The method 500 includes, at 504, processing, contemporaneously with the first transmission, using a second transceiver circuit of the wireless device, a second transmission in a channel in the second frequency band that is different from the first frequency band.

With respect to 502 and 504, processing may mean transmitting or receiving. For example, the method 500 may be useful to mitigate in-device interference when both transceiver circuits are receiving signals, transmitting signals or one transceiver is receiving while the other transmitter is transmitting an RF signal.

To choose the channels in the first frequency band and the second frequency band in a manner that mitigates unwanted radio frequency interference between the first transmission and the second transmission, the method may store, at 506, one or more pre-defined channel conflict tables in a memory, wherein each conflict table comprises entries that identify pairs of frequency bands that cause undesirable intra-device radio frequency interference when used simultaneously.

The method 500 may compare, at 508, the channels in the first frequency band and the second frequency band with entries in the one or more pre-defined channel conflict tables to check for match. Examples of conflict tables are described with respect to Table 1, Table 2 and Table 3. The comparison operation may, e.g., compare the channels in each one of the first frequency band and the second frequency band with entries of the tables, which represents channel pairs that represent conflicting condition. In some embodiments, the entries in the conflict table may be arranged by the network type. For example, the first frequency band may be defined with respect to one wireless protocol (e.g., Wi-Fi or LTE) and the second frequency band may be defined with a different wireless protocol. In various embodiments, the frequency bands may be listed for uplink-only, downlink-only or both uplink and downlink use.

The method 500 may, at 510, selectively changing value of at least one of the channels in the first frequency band and the second frequency band such that the channels in the first frequency band and the second frequency band are a pair that is different from every pair of frequency channels listed in the one or more pre-defined channel conflict tables.

As described, e.g., with respect to Table 1, Table 2 and Table 3, the first frequency band and the second frequency band may be for operation using a different wireless protocol. For example, one frequency band may be used for WLAN communication while the other frequency band may be used for cellular communication, e.g., 3G communication or LTE communication, and so on.

In some embodiments, the selectively changing the channel value may be performed iteratively via communication between the wireless device and a network-side entity such as a base station or an access point. For example, in some embodiments, the network-side entity may not be aware of the conflicting channel information for the wireless device and may end up assigning a different channel for communication, when requested by the wireless device, which also is a conflicting channel. Therefore, the wireless device may request multiple times to change the channel used for communication, either uplink, or downlink, or the combined uplink/downlink channel in case of TDD operation, until the resulting channel pair is not an entry in the channel conflict tables.

In some embodiments, the method 500 may include repetitively implementing conflict resolution when the operational frequency of one or both network interfaces changes, e.g., due to the mobility of the wireless device and hand-off from one coverage area to another.

While method 500 is described with reference to a table of conflicting channel, such conflict resolution may also be performed using lists, state machines, arrays, logical expression, and so on. For example, a state machine may be programmed to accept a first channel frequency and a second channel frequency as inputs, and produce a binary output representing whether the combination is okay to use or not.

Figure 6:
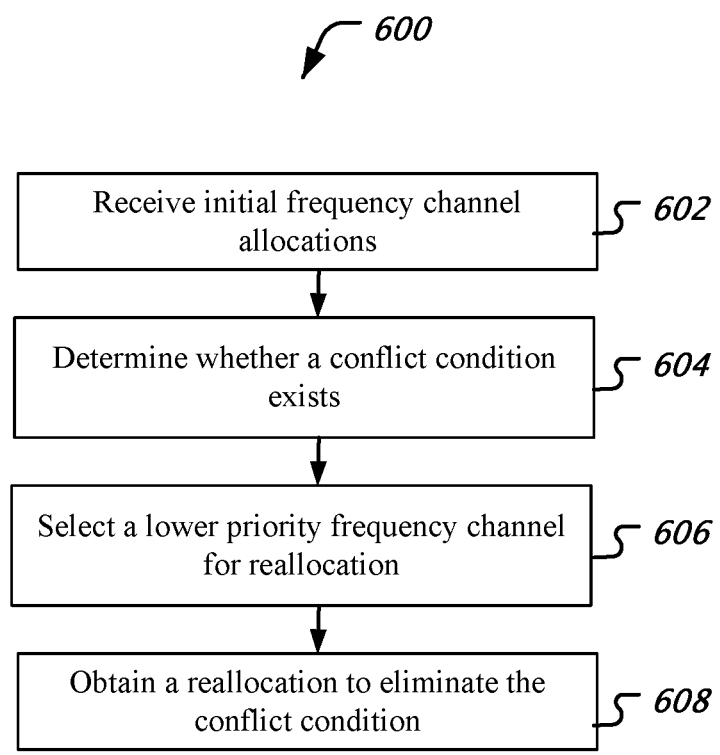
FIG. 6 is a flowchart of an example method for wireless communication.

FIG. 6 shows a flowchart for an example method 600 of wireless communication implemented in the mobile device 204. The mobile device 204 may implement method 600 at the beginning of a communication session when entering a network newly, or repeatedly during an ongoing operation when certain network features change, e.g., the mobile device 204 gets handed off to a different network server due to mobility.

The method 600 includes, at 602, receiving initial frequency channel allocations. For example, as described herein, many wireless communication protocols work by having the mobile device 204 scan the wireless medium for the presence of a network, and request entry to a network when the scan detects the presence of the network. Upon making the request, the mobile device 204 may then receive frequencies to use for future uplink and downlink channel operation with the network. In some embodiments, the frequency allocations may include two different frequencies in one direction of communication, e.g., two channels for downlink communication using channel aggregation.

The method 600 includes, at 604, determining whether a conflict condition exists for the received initial frequency channel allocations. In some embodiments, the determining whether the initial frequency allocations are in the conflict condition includes checking whether the initial frequency allocations are stored as being conflicting in a local memory. In some embodiments, the usage priority is a fixed, pre-determined priority that is based on protocols used by the wireless connections. In some embodiments, the usage priority is based on identities of applications that are requesting the receptions and/or transmissions. In some embodiments, the usage priority is based on time sequencing of initialization of applications on the wireless device. For example, in some embodiments, a first application that starts first may receive priority over a second application that is initiated later in time.

The method 600 includes, at 606, selecting a lower priority frequency channel for reallocation. As described herein, the lower priority frequency channel may be the channel being used for uplink or downlink data transmission by a lower priority application. An application may present data to a user on the display 130 and may receive inputs from the user via modules 132,136, 138 or 144.

The method 600 includes, at 608, obtaining a reallocation to eliminate the conflict condition. The obtaining process may comprise iteratively requesting a reallocation, receiving a reallocation of the frequency band, checking whether a conflict condition has been resolved and re-request reallocation to receive a next reallocation, until the conflict condition is resolved.

In some embodiments, the initial frequency allocations may be for two channels which are to be used for channel aggregation. The method 600 may include performing channel aggregation using the initial frequency channel allocation wherein transmission bandwidth of two non-contiguous frequency bands is combined to provide a higher bandwidth physical layer connection to the wireless device.

Figure 7:
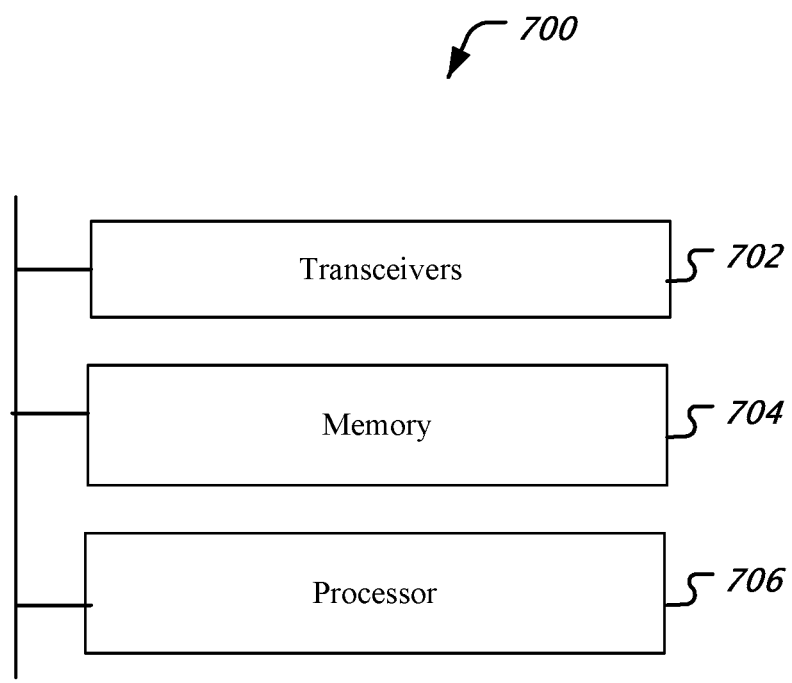
FIG. 7 is a flowchart of another example method for wireless communication.

FIG. 7 is a block diagram representation of an example wireless communication apparatus 700. The apparatus 700 includes multiple transceivers 702, one or more memories 704 and one or more processors 706. The transceivers 702 are electrically connected to one or more antennas, possibly through a switch or a multiplexer, to perform simultaneous operation, e.g., transmission or reception, over two different frequency bands.

The one or more memories 704 store one or more pre-defined channel conflict tables having a number of entries, wherein each entry in the one or more channel conflict table identifies a pair of RF channels such that operation of the apparatus with the at least two RF signals corresponding to the pair of RF channels causes an unwanted RF interference in the apparatus.

The processor 706 controls, by checking at least one of the one or more pre-defined channel conflict tables, operation of the at least two RF transceiver circuits to exclude use of the pair of RF channels by the at least two RF transceiver circuits, thereby mitigating the unwanted RF interference in the apparatus 700.

In some embodiments, the processor 706 receives a message that specifies a frequency band for future operation of one of the at least two RF transceiver circuits and checks whether the frequency band of future operation produces the unwanted RF interference in the apparatus 700.

In some embodiments, the radio frequency transceivers periodically report the operation channels to the processor, and its channel manager compares the operating channels against the pre-defined channel conflict tables to determine whether channel adjustment is needed or not. The periodic reporting may be performed, e.g., at a fixed time period, e.g., 1 to 2 seconds, or may be performed when working condition such as signal to noise ratio changes at least by a certain pre-determined amount.

It will be appreciated that several techniques for mitigating intra-device RF interference are disclosed. To help with the mitigation of interference, conflicting channel tables may be stored in the device. These tables may include entries of frequency bands or channel groups that are not to be used because they are known to cause intra-device interference. The generation and storage of tables may be performed a priori.

It will further be appreciated that the disclosed techniques may be used to maintain frequency band allocated to a higher priority communication, while changing the frequency used by a lower priority of the multiple communications simultaneously being performed by a wireless device. The priority may be determined based on one of several possible ways described in the present document.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. A wireless communication method implemented in a mobile device, comprising:
    receiving, via a network interface, initial frequency channel allocations for use by the mobile device in future simultaneous wireless communications;
    determining, prior to performing wireless transmissions using the initial frequency channel allocations, whether the initial frequency allocations are in a conflict condition because operation using the initial frequency allocations will cause in-device radio frequency interference when receptions and/or transmissions are simultaneously performed;
    selecting for reallocation, when the initial frequency allocations are conflicting, based on usage priorities currently associated with the wireless connections, a first initial frequency channel allocation from the initial frequency channel allocations having a lower priority than other frequency allocations from the initial frequency channel allocations; and
    obtaining, via the network interface, a reallocation of the first initial frequency allocation to a new frequency allocation, thereby eliminating the conflict condition.

2. The method of claim 1, wherein the initial frequency channel allocations are for two frequency bands used in a carrier aggregation setting.

3. The method of claim 1, wherein the determining whether the initial frequency allocations are in the conflict condition includes checking whether the initial frequency allocations are stored as being conflicting in a local memory.

4. The method of claim 1, wherein the usage priority is a fixed, pre-determined priority that is based on protocols used by the wireless connections.

5. The method of claim 1, wherein the usage priority is based on identities of applications that are requesting the receptions and/or transmissions.

6. The method of claim 1, further including, when the usage priorities change, re-checking for the conflict condition; and when a conflict condition exits, requesting a reallocation to change a frequency band used for the wireless communication.

7. The method of claim 1, further including:

performing channel aggregation using the initial frequency channel allocation wherein transmission and/or reception bandwidth of two non-contiguous frequency bands is combined to provide a higher bandwidth physical layer connection to the wireless device.

8. The method of claim 1, wherein the obtaining the reallocation includes iteratively receiving frequency band reallocations and checking whether the conflicting condition is eliminated.

9. A computer program product storing instructions, when executed, causing a processor to implement a method in a mobile device, the instructions comprising:

instructions for receiving, via a network interface, initial frequency channel allocations for use by the mobile device in future simultaneous wireless communications;

instructions for determining, prior to performing wireless transmissions using the initial frequency channel allocations, whether the initial frequency allocations are in a conflict condition because operation using the initial frequency allocations will cause in-device radio frequency interference when receptions and/or transmissions are simultaneously performed;

instructions for selecting for reallocation, when the initial frequency allocations are conflicting, based on usage priorities currently associated with the wireless connections, a first initial frequency channel allocation from the initial frequency channel allocations having a lower priority than other frequency allocations from the initial frequency channel allocations; and instructions for obtaining, via the network interface, a reallocation of the first initial frequency allocation to a new frequency allocation, thereby eliminating the conflict condition.

10. The computer program product of claim 9, wherein the initial frequency channel allocations are for two frequency bands used in a carrier aggregation setting.

11. The computer program product of claim 9, wherein the instructions for determining whether the initial frequency allocations are in the conflict condition include instructions for checking whether the initial frequency allocations are stored as being conflicting in a local memory.

12. The computer program product of claim 9, wherein the usage priority is a fixed, pre-determined priority that is based on protocols used by the wireless connections.

13. The computer program product of claim 9, wherein the usage priority is based on identities of applications that are requesting the receptions and/or transmissions.

14. The computer program product of claim 9, wherein the instructions further include, instructions for, when the usage priorities change, re-checking for the conflict condition; and instructions for, when a conflict condition exits, requesting a reallocation to change a frequency band used for the wireless communication.

15. The computer program product of claim 9, wherein the instructions further include:

instructions for performing channel aggregation using the initial frequency channel allocation wherein transmission and/or reception bandwidth of two non-contiguous frequency bands is combined to provide a higher bandwidth physical layer connection to the wireless device.

16. The computer program product of claim 9, wherein the instructions for obtaining the reallocation include instructions for iteratively receiving frequency band reallocations and checking whether the conflicting condition is eliminated.

* * * * *